United States Patent

[11] 3,588,511

| [72] | Inventor | James R. Montagne<br>327 San Jose Ave., Apt. 1, Los Gatos, Calif. 95030 |
|---|---|---|
| [21] | Appl. No. | 733,521 |
| [22] | Filed | May 31, 1968 |
| [45] | Patented | June 28, 1971 |

[54] SHUTTER ARRANGEMENT FOR RADIOGRAPHY
3 Claims, 4 Drawing Figs.

[52] U.S. Cl. .................................................. 250/105, 250/65
[51] Int. Cl. ........................................................ G03b 41/16
[50] Field of Search .............................................. 250/53, 57, 58, 105, 65

[56] References Cited
UNITED STATES PATENTS

| 2,224,077 | 12/1940 | Haupt et al. ............. | 250/105 |
| 2,798,958 | 7/1957 | Hudson et al. ............. | 250/105X |
| 3,091,691 | 5/1963 | Snow ......................... | 250/58 |

Primary Examiner—James W. Lawrence
Assistant Examiner—A. L. Birch
Attorney—Edward A. Robinson ABSTRACT: Radiographs are made by exposures of x-rays upon a photographic surface wherein x-ray impervious shutters are independently positionable to provide an aperture for exposing a desired area of the photographic surface, and for blocking radiation to other areas. Electrical contacts are provided on the shutters which will close an electrical circuit to cut the power of drive motors when either shutter reaches the limit of its travel, or when the two shutters close together. The shutters are mechanically supported by electrically insulated cables which further provide a connecting circuit between electrical contacts on the shutters and the motor control system.

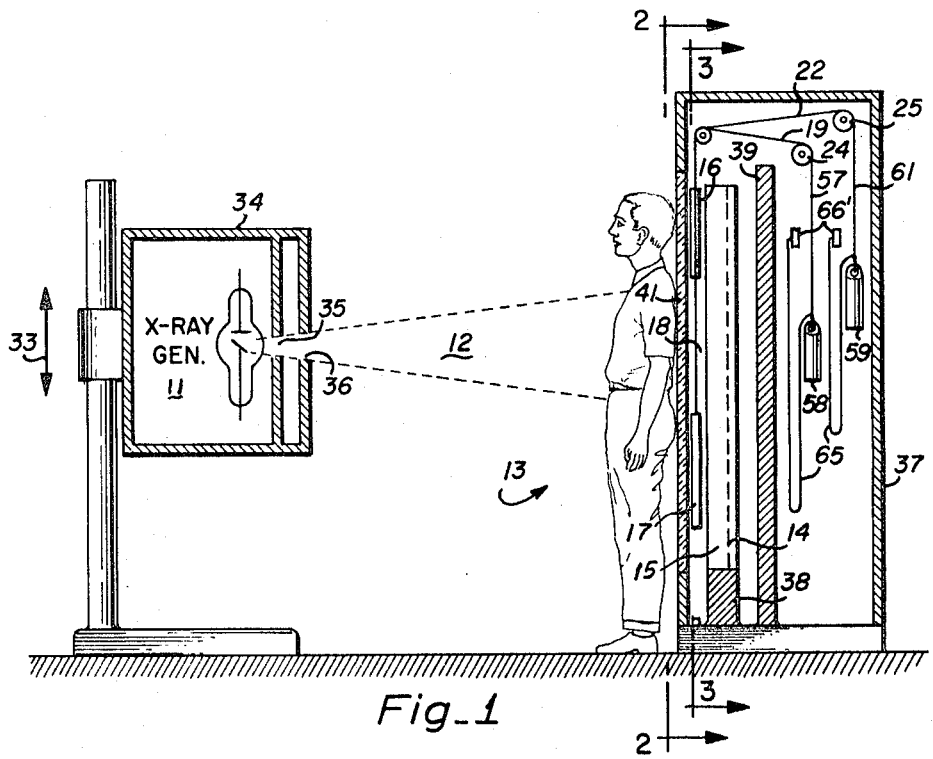
Fig_1
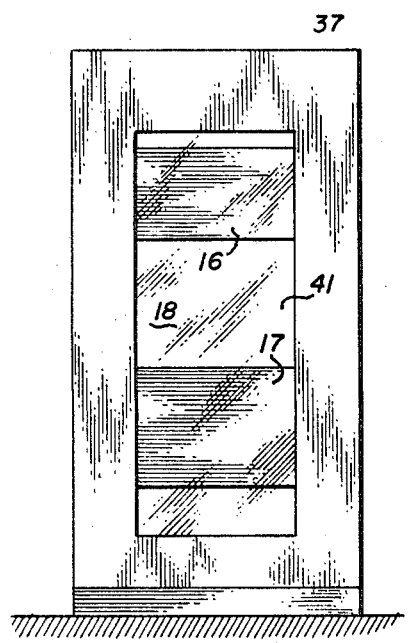
Fig_2
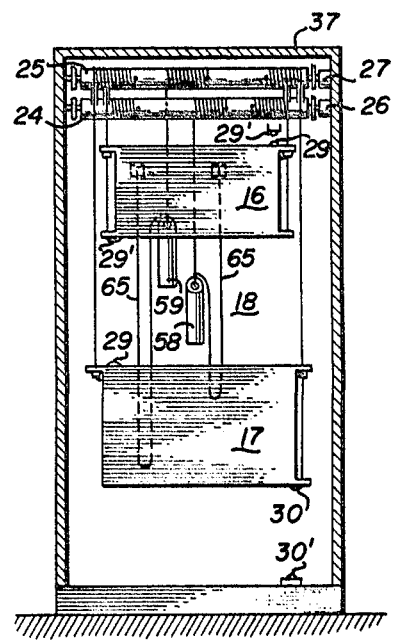
Fig_3
INVENTOR.
JAMES R. MONTAGNE
BY
Edward A. Robinson
ATTORNEY

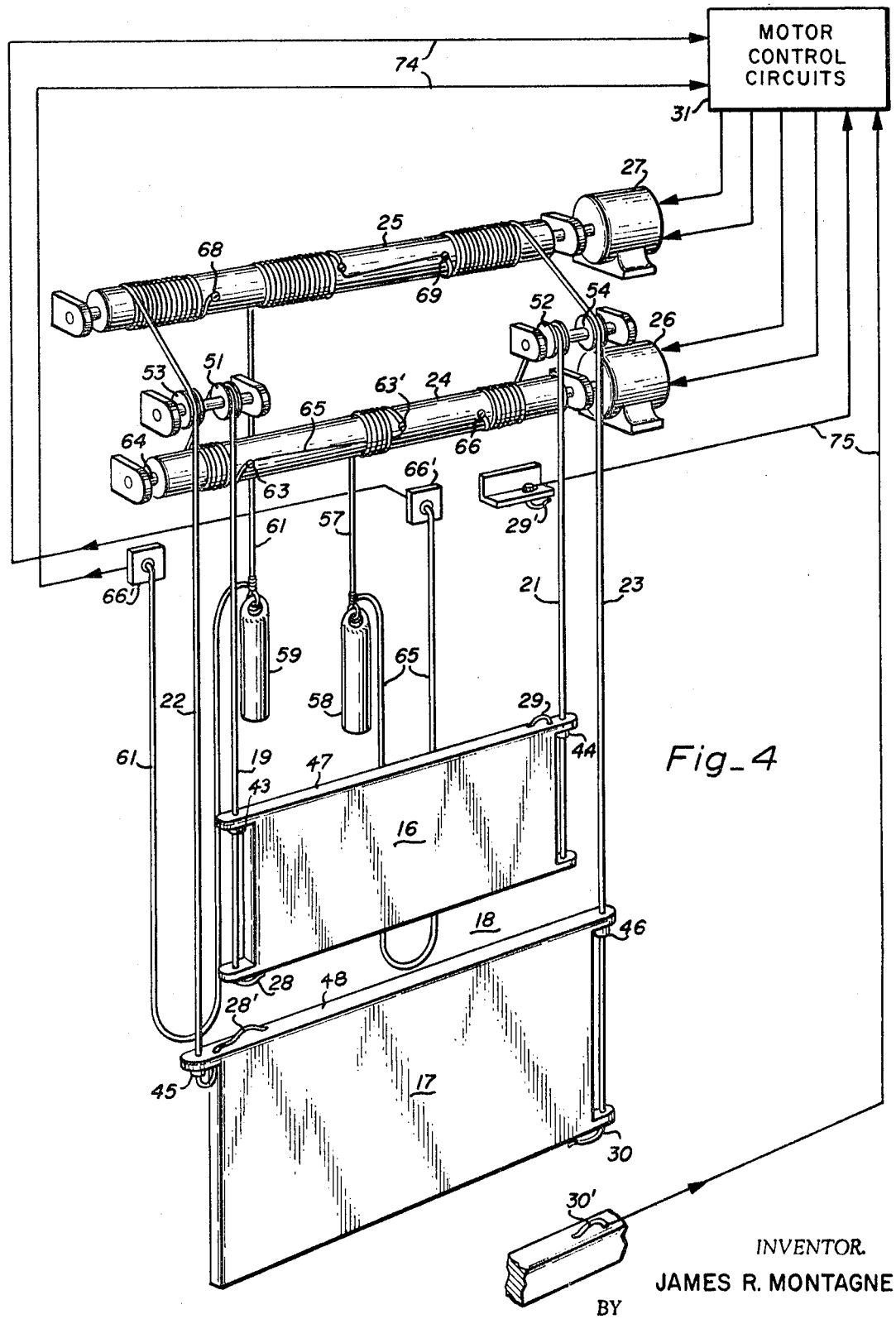
Fig_4

SHUTTER ARRANGEMENT FOR RADIOGRAPHY

This invention relates to x-ray photography, and more particularly, to an arrangement for holding and supporting a photographic plate or film, the areas of which may be exposed by a sequence of separate x-ray exposures.

In the x-ray art, a radiograph is a permanent record or picture made by exposing photographic film to a latent image carried by x-rays. The film is housed in a cassette which is a lighttight enclosure. The cassette protects the film from exposure from light, but permits the film to be exposed to x-rays which will penetrate into and through the cassette. Photographic film is more sensitive to visible light than to x-ray radiation; and therefore, it is customary to use an intensifying screen within the cassette in conjunction with the photographic film. The intensifying screen overlies the film, and is fluorescent in character. Normally the intensifying screen remains dark and will not expose the light sensitive film against which it is positioned. However, when the intensifying screen becomes exposed to x-ray radiation, the screen fluoresces and emits further radiation in the form of visible light. The photographic film is thereby exposed both to the x-ray radiation and to the visible light emitted by the intensifying screen.

Radiographs may be made by placing a patient in a standing position before a cassette in an upright position for exposure to x-rays from a source spaced horizontally from the patient; or the patient may be placed in a prone position upon a table with a cassette beneath the table surface and with x-rays penetrating downwardly from a source above the patient. The x-ray source normally includes a means for collimating the beam, such that the x-rays will be nearly parallel in a well-defined cone to penetrate only a desired region of the patient's body and to impinge upon a desired area of the cassette It may be appreciated that the (1) x-ray source, the (2) appropriate part of the patient's body, and the (3) cassette must be positioned and aligned such that the x-rays will penetrate the patient's body and impinge upon the cassette with a minimum of distortion due to angulation of the x-rays.

When a mass such as the body of a patient is exposed to direct radiation of x-rays, that mass becomes a source of secondary or scatter radiation of x-rays. Within the cassette, the intensifying screen and the photographic film are sensitive both to the direct radiation and to the scatter radiation. The direct radiation contains the latent image to be reproduced as a radiograph, but the scatter radiation is randomly directed from the patient's body and tends to randomly expose and to fog the film. Thus it is desirable to provide a means for shielding the cassette from scatter radiation while passing the direct radiation hereto.

The problem of scatter radiation has been partially solved by the use of a grid positioned ahead of the cassette. The grid includes parallel strips of lead or other material which is impervious to x-rays forming parallel slits. This arrangement may be likened to a venetian blind. The alignment is such that the direct radiation originating from the x-ray generating machine will pass between the strips of the grid in the same manner that light may pass through the openings of a venetian blind. On the other hand, much of the scatter radiation will not pass through the grid, because of the random directions of this secondary radiation will not be generally aligned with the openings of slits of the grid. A "bucky" is a type of grid used in the x-ray art which is movable during an x-ray exposure whereby no fixed image of the grid will be reproduced on the radiograph. The grid of a bucky may either move linearly during an exposure, or the grid may have an oscillatory motion. In another form, the grid is stationary but is of such a fine grained structure that the image thereof will not be reproduced on the radiograph. Although much of the scatter radiation is intercepted by the grid, a considerable portion is directed at angles extending relatively longitudinally with respect to the openings of the grid, and this portion may pass through to the cassette and tend to fog the film.

If it is desired to make an x-ray record or radiograph of an extensive part of a patient's body, such as the entire spine including the cervical, thoracic, the lumbar and pelvic regions, a single x-ray exposure has proven to be unsatisfactory. The degree of penetration of x-rays through a body is dependent upon the mass of the body. An x-ray photograph of the cervical region, or neck, of a patient for example requires less x-ray penetration and less exposure time than a similar x-ray photograph of the more massive lumbar region of the patient's body. Therefore, the same exposure time would not be satisfactory for making an x-ray photograph of the cervical or neck region as the more massive lumbar region. It is more satisfactory to make a composite photograph using different exposures of the different regions of the body. Furthermore, the x-ray beam or cone of radiation should be maintained substantially at right angles to the patient's body and to the cassette to minimize distortion. To obtain a good radiograph, the x-ray generator or source of x-rays should be aligned for each exposure and directed at the appropriate part of the patient's body and a corresponding region of the film or cassette without angular distortion.

It is an object of this invention to provide an improved arrangement for making a composite x-ray radiograph from several x-ray exposures; and more particularly it is an object to provide independently movable shutters or impervious shields to provide an aperture of any desired position and with respect to the confirmation of a particular patient's body such that a particular region of the photographic surface contained in the cassette may be exposed to x-rays while other regions will be protected from radiation and particularly from scatter radiation. A further object of this invention is to provide an improved stand for x-ray radiography containing a cassette, a grid and x-ray impervious shutters to exclude extraneous scatter radiation from the cassette, and more particularly, it is an object to provide a cable arrangement for both mechanically supporting the shutters and for providing electrical conductors for control circuitry and an electrical protection system.

Another object of this invention is to provide an improved stand containing a cassette, a grid, and independently movable shutters having electrical contacts which will engage to close a protection circuit for cutting off driving power when the two shutters close together or when either shutter reaches a limit of travel.

Other objects and advantages will become apparent throughout the progress of this specification which follows. The accompanying drawings illustrate a certain selected embodiment of this invention and the views thereon are as follows:

FIG. 1 is a vertical cross-sectional view illustrating an x-ray generating source, a patient, and a stand containing shutters, and a cassette in accordance with the teachings of this invention;

FIG. 2 is a front elevational view looking along the plane 2-2 FIG. 1;

FIG. 3 is a vertical section looking along the the plane 3-3 FIG. 1 wherein certain parts have been removed to reveal the underlying structure; and FIG. 4 is a schematic view showing only those working parts of the cassette stand concerned with this invention—the parts being shown in perspective.

Briefly stated, according to this invention, a source of x-rays 11 provides a column of x-rays 12 for penetrating a patient's body 13 to expose a photographic film 14 within an enclosed cassette 15. A pair of shutters 16 and 17 are impervious to x-rays and protect the film near the upper end and lower end of the cassette 15. An aperture 18 between the shutters will expose a desired portion of the film 14. The upper shutter 16 is supported by a pair of electrically insulated cables 19 and 21, and the lower shutter 17 is likewise supported by a similar pair of cables 22 and 23. The cables are partially wound about a pair of rolls or drums 24 and 25 which may be rotated by drive motors 26 and 27 for independently lowering or raising the shutters 16 and 17.

The upper shutter 16 is provided with an electrical contact 28 along the lower part thereof; and similarly, the lower shutter 17 is provided with an electrical contact 28' along the upper part thereof. An electrical contact 29 is positioned along the upper part of the upper shutter 16; and a further contact 29' is in a stationary position to engage the contact 29 when the upper shutter moves to a limit of its upward travel. Similarly a contact 30 is at the lower edge of the lower shutter 17 to engage a stationary contact 30' when the lower shutter 17 reaches a limit of its downward travel. The electrical contacts 28–28' are positioned to engage when the shutters close together; and the contacts 29–29' or 30–30' engage when a respective shutter reaches its limit of travel to provide a switch closure for motor control circuits 31 to cut off the power to the drive motors 26 and 27 for preventing motor burnouts or other damage to the system.

As shown in FIG. 1, the x-ray generator is movable vertically as indicated by the double arrows 33. The x-ray generator may be enclosed in a housing 34 which is impervious to x-rays, and a pair of apertures 35 and 36 provide collimation to form a conical x-ray beam 12 which may be directed to a particular part of the body of the patient 13. After penetrating through the patient's body 13, the x-rays will pass into a cabinet 37 constructed in accordance with the teachings of this invention. The enclosure 15 may contain a movable or stationary grid together with a cassette and the cabinet 37 may be designated as a bucky cassette stand. The cassette 15 with the film therein may be handled and stored without exposure of the film 14. The cassette is held on a mounting 38 behind which is positioned a lead shield 39 for blocking all x-ray after passage through the bucky.

The shutters 16 and 17 are positioned in a plane between the bucky and cassette 15 and patient's body 13 and are independently movable in that plane. A transparent panel 41 is positioned ahead of the shutters to complete the enclosure of the bucky and cassette stand 37. The transparent panel 41 may be a plastic material such that the position of the shutters 16 and 17 may be visually observed therethrough. Indeed, it is contemplated that the shutters 16 and 17 may be painted to contrast with the background. FIG. 2 shows the front of the bucky stand as it would be seen by an x-ray technician or doctor from the front thereof. The shutters 16 and 17 are clearly visible through the transparent panel 41 and the aperture 18 between the shutters may be positioned to expose that part of the film 14 corresponding with the region of the patient's anatomy to be exposed to x-rays.

If a doctor wishes to prepare an x-ray photograph of a patient's spine, for example, the x-ray generating machine 11 and the two shutters 16 and 17 may be sequentially positioned to provide three exposure areas on the same film 14 within the cassette 15. The x-ray machine may be raised to a height corresponding with the patient's neck for a first exposure of the cervical region; and during this exposure the two shutters 16 and 17 will be correspondently raised to positions for providing an aperture 18 directly behind the intended cervical region.

This exposure may be of shorter duration since the patient's neck or cervical region is considerably less massive than the patient's lumbar region which will exposed subsequently. During the subsequent exposures the X-ray machine 11 and the shutters 16 and 17 will be correspondently lowered to expose just the proper regions of the patient's body and to protect the film 14 from all spurious radiations not within the aperture 18. Obviously, different patients will have different heights and body configurations such that a doctor or technician must adjust the x-ray machine 11 and the shutters 16 and 17 with regard to each patient individually. The exposure time and the width of the x-ray beam 12 may be adjusted with each exposure.

The shutter drive and control arrangement is best shown in FIG. 4. The cables 19 and 21 are fastened to the shutter 16 by means such as clamps 43 and 44 such that the shutter 16 is suspended and held by the cables 19 and 21. Similarly a pair of clamps 45 and 46 attach the shutter 17 to the cables 22 and 23, and the lower shutter is suspended in the same plane as the upper shutter 16. The shutters 16 and 17 may be formed from any x-ray impervious material. In a preferred form of this invention the shutters were formed by frames 47 and 48 which are made of a structural material such as steel or aluminum. Indeed an aluminum frame may be used to support an x-ray impervious panel formed from lead. Thus the shutters 16 and 17 are fabricated from a good structural material which supports lead panels impervious to x-rays. The cables 19, 21, 22, and 23 pass over aligned pulleys 51, 52, 53 and 54 the pulleys are all similarly mounted on the same axis of rotation such that the cables 19, 21, 22 and 23 will support the shutters 16 and 17 in a single plane. After passing over the pulleys 51 and 52, the cables 19 and 21 are partially wound about the drum 24. Similarly the cables 22 and 23 pass over the pulleys 53 and 54 and are wound about the drum 25. The drums 24 and 25 may be controllably rotated by the motors 26 and 27 such that the shutters 16 and 17 may be independently moved to any desired position.

While the drawings show the shutter arrangement for a vertical bucky cassette stand with the patient standing in a position before the bucky cassette and with the shutters 16 and 17 moving in the same vertical plane, it will be appreciated that this invention also applies to the situation where a patient lies upon a table with a bucky and cassette horizontally beneath the patient.

If the bucky and cassette is placed horizontally, the shutters must be mounted to slide horizontally along tracks and the cables 19, 21, 22 and 23 must move horizontally. In a horizontal arrangement, the cables must be clamped to the shutters 16 and 17 and extend in a closed loop through the opposite end of the shutter travel and then to return to the drive motor end. In the horizontal configuration, structural guide ways must be provided for the horizontal movement of the shutters 16 and 17 which may move therealong as independent carriages. In the vertical configuration as shown by the drawings, the shutters 16 and 17 do indeed move in guide ways—the guide ways being formed by the forward surface of the bucky cassette enclosure 15 and the rearward surface of the transparent panel 41 and other closing members of the bucky cassette stand 37. However, no particular rollers or special guides need be provided for the vertical configuration since the shutters may simply be suspended from the aligned pulleys 51, 52, 53 and 54. As shown in FIG. 4 the cables 19 and 21 are wound about the drum 24. A further cable 57 supports a counter weight 58 and is wound about the drum 24 in the opposite direction. Thus if the drum 24 is rotated to raise the shutter 16 the cables 19 and 20 will be wound there about and shortened while the cable 57 will be released to lower the counterweight 58. It will therefore be appreciated that within the limits of movement of the system, the shutter 16 will be counterweighted by the weight 58 such that the motor 26 may provide a minimum of drive power to move this system.

A spring contact 28 may be mounted at the lower edge of the frame 47 which forms the structural part of the shutters 16. Similarly another spring contact 28' is mounted on the top of the frame 48 forming the structural part of shutter 17. The contacts 28 and 28' are so positioned and aligned that should the shutters 16 and 17 close together the contacts will engage to complete an electrical control circuit for cutting off the power to the motors 26 and 27. Since the contacts 28 and 28' are springs, a certain resiliency is introduced whereby the electrical circuits may be made, and the contacts may yield somewhat without imparting undue stress to the structural members. Another spring contact 29 is on the upper part of the structural frame 47 of the upper shutter 16. The contact 29' is mounted on a stationary support in position to engage the contact 29 when the upper shutter is moved upwardly to an extreme limit of travel. The contacts 29–29' are electrically connected to the motor control circuit 31, and are operable to cut off the power to the drive motor 26 when the shutter 16 moves to the upper limit of travel. Similarly the spring contact 30 mounted at the bottom of the lower shutter 17 is positioned to engage the further electrical contact 30' and stop the motor 27 when the lower shutter moves downwardly to a limit of travel.

As shown in FIG. 4 the contact 28 is electrically connected to the cable 19, and the electrical contact 29 similarly connected to the cable 21. The cable 19 is electrically insulated and extends over the pulley 51 and is partially wrapped about the drum 24. This cable terminates at an electrical connection 63, and an electrical conductor 64 connect the terminal 63 to a similar terminal 63' coupled to the cable 57 which supports the counterweight 58. As shown in FIG. 1, the counterweight 58 is suspended on the cable 57 to the rear of the cabinet 37. A flexible electric cable 65 is electrically connected between the counterweight suspension cable and a stationary part of the cabinet 37. Thus it will be appreciated that an electrically conductive path extends from the contact 28 on the movable shutter 17 via the supporting cable 19 to a terminal 63 on the rotatable drum 24, thence via a conductor 64 on the drum to a further connection 63', thence via the counterweight cable 57 to a connection with the flexible cable 65 which makes a downward loop and ultimately connects to a stationary terminal 66. By providing the flexible cable 65 associated with the counterweight in the rear of the cabinet 37, rather than associated directly with the movable shutter 17, a problem of space is solved, because there is more room for a flexible cable loop in the rear of the enclosure 37. Furthermore the flexible cable loop is hidden behind the bucky-cassette enclosure 15, and does not create an unsightly image which could be seen through the transparent panel 41, or which might inadvertently appear on the ultimate radiograph which could have resulted from a shadow in the x-ray radiation passing to the cassette. As shown in FIG. 4, further electrically conductive paths are provided from the other electrical contacts 28, 29 and 30 on the movable shutters by the supporting cables 21, 22 and 23 in conjunction with the counterweight cables 57 and 61. Fixed electrical wiring 74 and 75 complete the electrically conductive paths to the motor control circuit 31.

The cables 19, 21, 22 and 23 serve the dual purpose of providing mechanical suspension for the shutters 16 and 17 and also electrical paths for the control circuitry of this invention. This provides the advantage of simplification in that extra electrical leads do not have to serve the moving structure of the shutters.

Changes may be made in the form, construction and arrangement of parts without departing from the spirit of this invention or sacrificing any of its advantages, and the right is hereby reserved to make all such changes as fall fairly within the scope of the following claims.

I claim:

1. Radiography apparatus comprising a source of x-rays, a cassette, a position for a patient's body between the source of x-rays and the cassette, a pair of shutters impervious to x-rays for shielding parts of the cassette from radiation, said shutters being movable in a plane between the patient's body and the cassette, means for moving and positioning each shutter independently of the other to provide an aperture therebetween of a desired width and positioning with respect to the patient's body, electrical contacts on both shutters positioned to engage each other for closing an electrical circuit when the shutters close together, and electrically insulated cables mechanically connected to move and support the shutters, said cables being electrically connected to the electrical contacts for providing an electrical circuit between said electrical contacts and said means for moving and positioning the shutters.

2. Radiography apparatus in accordance with claim 1 comprising a pair of rotatable drums, and a drive means for controllably rotating the drums, said cables being connected to said shutters being partially wound about the respective drums whereby controlled rotation of the drums will effect a desired positioning of the shutters.

3. Radiography apparatus in accordance with claim 2 comprising counterweights supported by an electrically insulated cable partially wound about the respective drums, an electrically conductive path on each drum extending between the electrically insulated cable supporting the respective shutters, and the electrically insulated cables supporting the counterweights, and flexible electrical cables connecting between the counterweights and stationary electrical terminals whereby electrical paths are provided from the movable electrical contacts on the shutters via the cables supporting the shutters and via the cables supporting the counterweights to the stationary electrical terminals.